United States Patent [19]
Raber

[11] Patent Number: 4,729,634
[45] Date of Patent: Mar. 8, 1988

[54] REFLECTIVE HEAD-UP DISPLAY

[75] Inventor: Peter E. Raber, Milford, Conn.

[73] Assignee: United Technologies Corporation, Hartford, Conn.

[21] Appl. No.: 697,677

[22] Filed: Feb. 4, 1985

[51] Int. Cl.⁴ .......................................... G02B 27/14
[52] U.S. Cl. .................................................. 350/174
[58] Field of Search ............... 350/619, 174, 443, 444, 350/446

[56] References Cited

U.S. PATENT DOCUMENTS

| | | | |
|---|---|---|---|
| 3,589,796 | 6/1971 | Schaefer | 350/174 |
| 3,923,370 | 12/1975 | Mostrom | 350/619 |
| 3,942,901 | 3/1976 | Ekstrand | 350/174 |

OTHER PUBLICATIONS

Applied Optics, vol. 13, No. 7, Jul. 1974, The Mangin Mirror and Its Primary Aberrations, by Max J. Riedl, pp. 1690–1694.

*Primary Examiner*—John K. Corbin
*Assistant Examiner*—Vincent J. Lemmo
*Attorney, Agent, or Firm*—Peter R. Ruzek; Robert P. Sabath

[57] ABSTRACT

A compact reflective head-up display incorporating first and second cooperative and converging mirror elements (34,18) one of which has a rear surface reflector (18), and the other of which (34) is partially transmissive and includes a central reflective portion (33), said first converging mirror (34) combining a remote image viewed by a pilot with a display image provided to said first converging mirror (34) by said second converging mirror (18).

6 Claims, 3 Drawing Figures

REFLECTIVE HEAD-UP DISPLAY

DESCRIPTION

1. Technical Field

This invention relates to the field of display technology and more particularly to the field of head-up displays incorporating converging mirrors.

2. Background Art

Head-up displays of the refractive and reflective kinds are well known. Their function in one instance is optically to provide a virtual image to an aircraft pilot as he continues to look outside the cockpit to view the outside scene, without diverting his attention.

More particularly, the pilot looks through an image combiner at the world outside his canopy windscreen as he scans his surroundings and the horizon with his eyes focused at infinity.

The combiner through which he looks is a partial reflector which directs a collimated display image toward the pilot. This virtual image, also focused at infinity, is thus super-imposed over the outside world without requiring the pilot to refocus his eyes.

The image may include stationary reticles and moving target indicators to direct aircraft fire against targets detected by radar for example.

To present an effective image for such applications, a high degree of angular fidelity is required. To achieve such a level of fidelity, image aberrations must be carefully controlled in the optical design of the combiner system.

It is further essential to present a clearly focused and properly directed image to both eyes of the pilot simultaneously. The pilot must perceive both images simultaneously as though coming from a single source at an optically infinite distance. Otherwise, visual discomfort and confusion will result.

Head-up displays of the past and present typically present a substantially large instantaneous field of view (IFOV), i.e. the angle subtended by a single pilot's eye of the image on the display. The display actually has an even larger field of view, but the position of the pilot's eye must be changed in order to see the complete display image. It is accordingly an object of the invention to maximize the IFOV, since this permits the pilot to see more of the display image at any instant, and minimizes the head motion required to enable his seeing the entire display image.

The instantaneous field of view of a head-up display is limited by the effective optical size of the converging optical element closest to the pilot's eye. Furthermore, any succeeding elements may be of the same size or smaller only to the extent that sufficient converging power is present in this first element.

In a conventional refractive head-up display adapted to the packaging constraints of an F-111 aircraft, the partially reflective combiner is flat, as is the internal folding mirror. The closest converging element to the pilot's eye is thus the first lens which is further away from the pilot than is the combiner. Furthermore, the effective diameter of this lens is limited by the folding requirement and other packaging constraints, particularly the need for non-interference between neighboring lens elements on opposite sides of the folding mirror. These factors result in a relatively small instantaneous field of view, which is typical of the limitations of conventional refractive head-up display optics in current fighter aircraft cockpits.

Prior art reflective head-up displays, require an extremely unconventional cathode ray tube (CRT) in which the display surface is visible to the optical system through a window in the side of the CRT tube. This makes magnetic shielding impossible and complex autocentering circuitry is typically required in order to prevent stray fields from corrupting the image viewed on the display. Furthermore, such prior art systems have only one optical element or combiner which is characterized by aberrations which cannot be effectively corrected throughout the entire field of view.

This results in the need for an extremely convoluted CRT phosphor surface requiring the inclusion of complex electron beam focusing and positioning electronics. This makes the CRT inordinately expensive, difficult to maintain, and unreliable. It is accordingly an object of the instant invention to replace this CRT with one of conventional type or make.

SUMMARY OF THE INVENTION

According to the invention herein, a head-up display employs a converging combiner with power provided by a curved internally reflective surface. The external curved surfaces of the combiner further provide refractive correction of image aberrations, and image compensation to permit focusing at optical infinity without positional distortion. The system also employs a second converging internally reflective mirror which is not present in prior art head-up displays, and which permits the incorporation of a conventional CRT in a head-up display system.

DETAILED DESCRIPTION OF THE INVENTION

Figure 1:
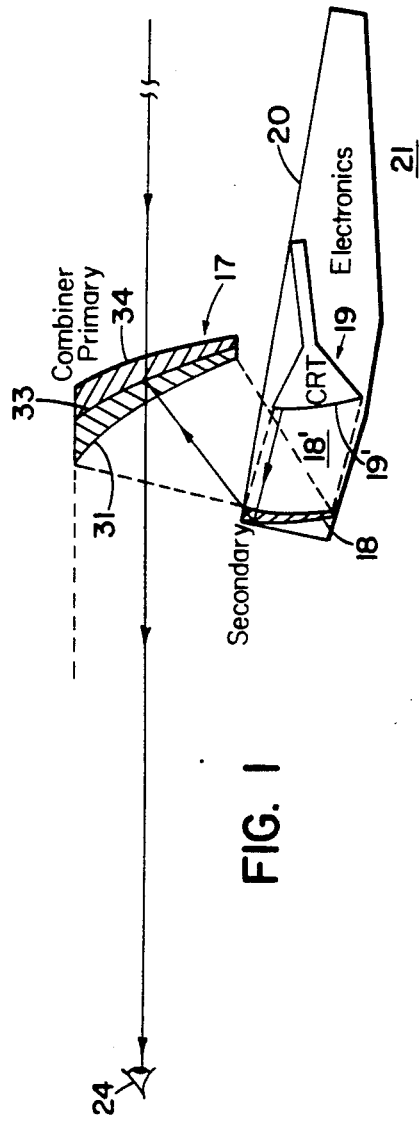
FIG. 1 is side view of a head-up display system according to the invention herein.

FIG. 1 shows an optical arrangement according to the invention herein including first and second rear surface reflective and converging elements 17 and 18. These are preferably of the Mangin type, and are effective for directing the display image of a CRT 19 in the nose volume 20 of an aircraft 21 towards a pilot's eye 24. The pilot or observer sees through element 17 and also views the reflected CRT image reflected by element 17. This arrangement including the CRT display image is preferably used as part of a fire control system for directing weapons systems including ordnance.

Element 17 is employed as an image combiner including a concave external portion 31 which partially corrects image aberrations by refraction. An internal partially reflective curved surface 33 of element 17 both converges and redirects the CRT image. Refraction by its convex external surface 34 compensates for the undesired deviation of light from the outside scene (not shown) which is simultaneously viewed by the pilot of the aircraft 21.

In short, first element 17 combines a remote image viewed by the pilot during flight with the display image transmitted from the second element 18 so that the observer sees the image of a display in a virtual sense at substantially the same optical distance as the real or external image he is directly viewing and interested in.

Mirror combiner element 17 is similar to an existing prior art F-111 head-up display combiner, but is located closer to the pilot. It has converging power which is substantial enough in conjunction with its location to increase the instantaneous field of view far beyond that attainable with a refractive head-up display confined to the same space. This power is chosen such that the instantaneous field of view is limited only by the size of the "secondary" element 18, which in turn is limited by the available packaging volume 20.

The internal secondary element 18 not only provides the essential additional reversal of image direction, but also provides further convergence and aberration correction. The presence of this mirror allows the CRT 19 to be located in the nose of the aircraft with its faceplate at the focal surface of the two-element combination including mirrors 17 and 18. Light emanating from this CRT 19 is collimated and directed toward the pilot's eye 24 by the two optical elements 17 and 18. The face of the CRT is slightly convex effectively to match with the remainder of the optical system.

The converging power of the secondary 18 is chosen such that the CRT 19 is caused to lie just outside the beam between the optical elements 17 and 18, rather than further removed in packaging volume 20, thereby establishing a compact design arrangement.

A diverging secondary 18 might appear plausible at first glance, since it would move the focal surface 19' further from the secondary 18, and its aberrations would appear to have an opposite sense to those of the primary 17. This reasoning is fallacious, however. Such an approach, similar to that of a Cassegrain telescope, would cause the entire system focal length to increase, and would require a larger CRT 19 in order to maintain the same total field of view. Scaling the system down to avoid this would reduce the diameter of the primary 17, and would therefore result in smaller instantaneous field of view. If the element diameters were then increased in an attempt to partially restore the instantaneous field of view, the larger ratio of diameter to focal length, combined with the system's Cassegrain-like angular magnification, would result in large off-axis image aberrations and unacceptable performance throughout most of the field of view.

A flat secondary 18 could similarly also produce the required direction reversal, but could not simultaneously both fit within the packaging volume 20 of the aircraft 21 and also be effective for noninterferingly locating the entire focal surface completely outside the beam between the primary and the secondary elements 17 and 18. Furthermore, a flat secondary 18 would be unable to provide the needed aberration correction, and would therefore result either in poorer performance, or in the need for a convoluted CRT phosphor surface.

In order to use a flat secondary 18, therefore, it would be necessary to introduce at least one additional element (not shown), or possibly several, to provide aberration correction and to re-image the focal surface at the CRT faceplate 19' and outside the primary-secondary beam 18'. This would add weight, decrease optical efficiency and disadvantageously occupy additional precious volume.

The invention accordingly calls for a convergent secondary 18. This allows the primary element 17 to be weakened, since the primary 17 and the secondary 18 both contribute to the total converging power of the arrangement. This also permits better adjustment for aberration than is possible with a single Mangin element, and even this correction can be improved with an aspheric surface and by tilting (and/or decentering) the optical axes of one or both elements 17 and 18 with respect to the CRT axis. The latter effect can also be at least partially achieved by means of a tilted plane-parallel plate (not shown) or preferably a wedge, inserted between the primary and secondary elements 17 and 18. This component may also serve as a cover to keep foreign matter away from the interior of the head-up display. In order to maintain optimum focus over the entire field of view, the CRT faceplate 19' should additionally be curved in a simple spherical shape.

Figure 2:
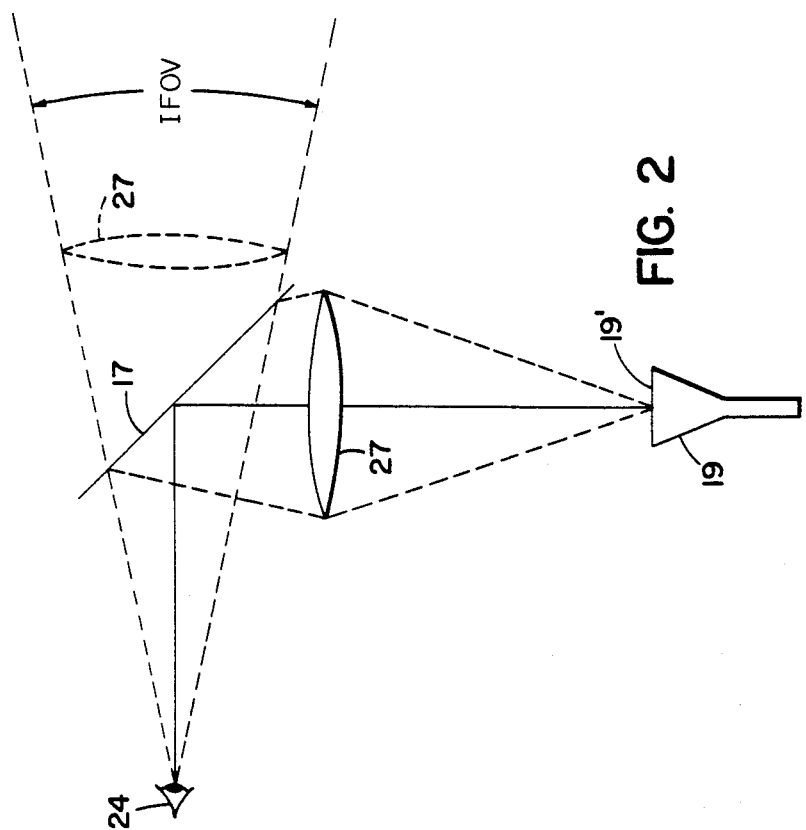
FIG. 2 is a diagram indicating the principle of instantaneous field of view (IFOV) for such a display system.

As already suggested and as shown in FIG. 2, the instantaneous field of view of a head-up display typically is limited only by the effective optical size (shown as phantom optical element 27) of the converging optical element 27 closest to the pilot's eye 24. Furthermore, any succeeding elements may be of the same size or smaller only to the extent that sufficient converging power is present in this first element 27. In general, the focal length of all portions of the optical systems between the pilot's eye 24 and any axial location within the optical system must be less than the actual axial distance between the location and the pilot's eye 24 in order to allow elements beyond the first element 27 to be no larger than the first element 27. If this condition is not met the instantaneous field of view of the system is even smaller than the angles subtended at the pilot's eye 24 by the first element's unobstructed size.

Figure 3:
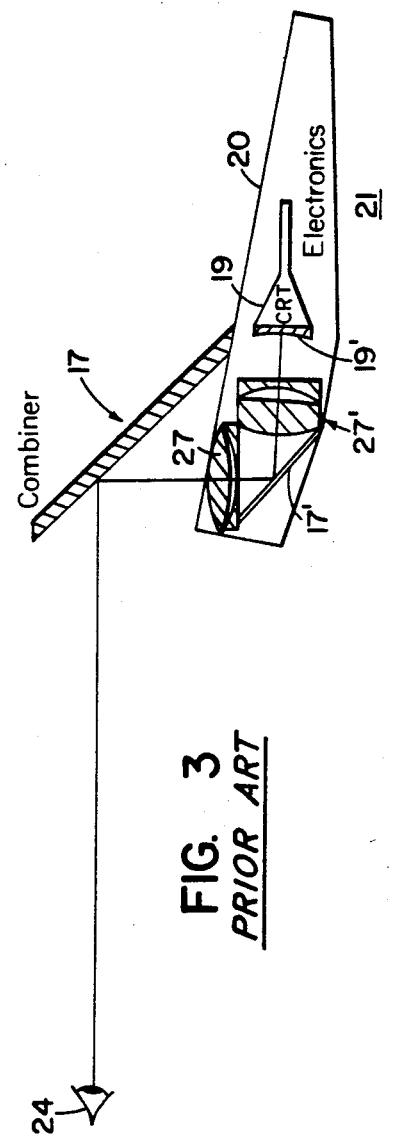
FIG. 3 shows a refractive display system with a flat combiner element.

FIG. 3 depicts a conventional refractive head-up display system adapted to the packaging constraints of an F-111 aircraft. In accordance with the refractive nature of the converging power of such systems the partially reflective combiner 17 is flat, as is the internal folding mirror 17'. The closest converging element to the pilot's eye 24 is thus the first lens 27, which is further away from the pilot than is the combiner. Furthermore, the effective diameter of this lens 27 is limited by the folding requirement and other packaging constraints, particularly the need for non-interference between neighboring lens elements on opposite sides of the folding mirror 17'. These factors result in a relatively small IFOV of about 10 degrees. This is typical of the limitations of conventional refractive head-up display optics in fighter aircraft cockpits where abnormally large packaging volumes are unavailable.

An optical system according to one version of the invention as shown in FIG. 1 includes using Mangin elements as the primary 17 and the secondary elements 18 in conjunction with a conventional CRT 19. The latter is for example tilted 4.5 degrees with respect to the optical elements, and has a faceplate of spherical contour. This design can be optimized to include a transparent cover or decentered/tilted Mangin elements to minimize off-axis astigmatism and coma.

The configuration further provides 12.5 degrees monocular instantaneous field of view according to the embodiment. Moreover, an 18 degrees total field of view is available with only a 3.6" displacement of the pilot's eye. Off-axis aberrations can further be reduced by making one of the optical surfaces, preferably one of the concave Mangin surfaces, aspheric.

The total field of view can additionally be increased by the pilot performing even greater eye displacement (e.g., perhaps 4.5 inch displacement to accomplish a 20 degree field of view).

The above may lead others to conceive of other schemes nonetheless contained within the scope of the invention addressed herein. Accordingly, the attention is directed toward the claims which follow as these define the metes and bounds of the invention with particularity.

I claim:

1. A head-up display arrangement for providing the image of a rearward facing display to the eye of a forward facing observer, said display being disposed in the direction of the observer, said arrangement comprising first and second converging means for reflecting the display image, characterized by said second converging means being situated closer to said display then said first converging means, facing substantially forwardly, having a concave rear surface reflector effective for reducing the separation between said display and said second converging means, and providing a reversal of image propagation direction directly onto said first converging means, and further convergence and aberration correction for said first converging means, and said first converging means facing substantially rearwardly, and being effective for combining an external image viewed by the observer with said display image, and for providing another reversal of image propagation direction for said display image.

2. The arrangement of claim 1, wherein said first converging means is further characterized in that it is effective for receiving a virtual image of said display.

3. The arrangement of claim 2, further characterized in that said virtual image is produced by said second converging means.

4. The arrangement of claim 1, wherein said optical arrangement provides said observer with an image of said display which is substantially at the same optical distance from the observer as is said external image.

5. The arrangement of claim 4, wherein said external image is at a remote distance.

6. The arrangement of claim 5, wherein said display image is part of a fire control system for directing ordnance.

* * * * *